United States Patent
Nagase

[11] 3,922,597
[45] Nov. 25, 1975

[54] CIRCUIT FOR DETECTING A PHYSICAL QUANTITY

[75] Inventor: Hiroshi Nagase, Nagoya, Japan

[73] Assignee: Kabushiki Kaisha Toyota Chuo Kenkyusho, Japan

[22] Filed: Oct. 29, 1973

[21] Appl. No.: 410,499

[30] Foreign Application Priority Data
Oct. 31, 1972 Japan.............................. 47-109626
Oct. 31, 1972 Japan.............................. 47-109627

[52] U.S. Cl.................... 323/75 B; 73/89; 323/75 N
[51] Int. Cl.²........................................... G01L 1/22
[58] Field of Search............... 73/88 R, 89, 362 AR; 323/74, 75 B, 75 N

[56] References Cited
UNITED STATES PATENTS
| | | | |
|---|---|---|---|
| 2,933,708 | 4/1960 | Elliot et al...................... | 73/362 AR |
| 3,530,286 | 9/1970 | Pelt et al........................ | 323/75 N |
| 3,817,104 | 6/1974 | Sapir.............................. | 73/362 AR |

*Primary Examiner*—A. D. Pellinen
*Attorney, Agent, or Firm*—Oblon, Fisher, Spivak, McClelland & Maier

[57] ABSTRACT

A circuit for detecting a physical quantity which comprises a bridge circuit including four sensitive elements having a resistivity which is variable in proportion to a physical quantity to be applied thereto. A power supply is connected to two input terminals of the bridge circuit for applying a voltage thereacross, and a variable resistor comprising a resistor having a predetermined resistance and an adjustable tap is provided for nulling the bridge. The circuit is arranged such that the zero adjustment of the output voltage may be accomplished by adjusting the resistance value of the variable resistor without affecting the characteristics of the thermal zero shift of the bridge circuit to thereby accurately obtain the output voltage corresponding to the physical quantity applied.

4 Claims, 14 Drawing Figures

CIRCUIT FOR DETECTING A PHYSICAL QUANTITY

BACKGROUND OF THE INVENTION

1. Field of the Invention:

The present invention relates to establishing the zero adjustment of the output of a full bridge circuit which includes four resistance elements whose values vary in response to the change of a physical quantity by regulating the output voltage under the condition that the physical quantity is not operated to the resistance elements, namely the initial unbalanced voltage. More particularly, the present invention relates to a circuit for detecting a physical quantity with a full bridge circuit, of which the zero adjustment can be carried out without any change in output in response to temperature variations, and furthermore with compensation of any change in output in response to temperature variations. Hereinafter, the characteristic of change in output in response to temperature variations will be referred to as the characteristic of "thermal zeroshift." Accordingly, any reference hereinafter to a good characteristic of thermal zeroshift means a characteristic such that the output scarcely changes with temperature.

2. Description of the Prior Art:

Conventionally, in a circuit for detecting a physical quantity having a full bridge circuit including elements responsive to the change of the physical quantity, the bridge output based on the initial unbalance of the resistance values of the resistance elements is adjusted to zero, for example, as follows. As shown in FIG. 1 and FIG. 2, variable resistances $R_1$, $R_2$, and $R_3$ are connected in series or in parallel with the resistance elements $G_1$, $G_2$, $G_3$, and $G_4$. However, the conventional methods include very serious defects. Namely, even if the bridge output is adjusted to zero by said method, at the same time the resistance temperature coefficient of the arms including the variable resistances is also varied, and then the thermal zeroshift (bridge output based on thermal stress to the resistance elements in response to the temperature change, or the bridge output based on the unequal temperature characteristics of the resistance elements in response to the temperature change) is increased, and thus the zero point of the bridge will undesirably drift while in use.

The resistance temperature coefficient as used in this specification can be represented by the following formula:

$$\alpha = \frac{\Delta R}{R} \times \frac{1}{\Delta T}$$

where $\alpha$ = resistance temperature coefficient
$R$ = resistance
$\Delta T$ = temperature change
$\Delta R$ = resistance change due to temperature change $\Delta T$ In another conventional technique for zero adjustment of the bridge output, two compensating resistances are employed, one of the resistances being disposed in series and the other in parallel, and the zero adjustment can be carried out without increasing the thermal zeroshift or together with the temperature compensation of the thermal zeroshift. According to this method, however, there are various defects, since it is necessary that the bridge circuit be made open at one junction and further, a complicated procedure is required to obtain the optimum values of the compensating resistances.

In cases where the output of the bridge circuit is amplified, as shown by the conventional circuit of FIG. 3, the differential D.C. amplifier 3 and two feedback resistors $R_4$ and $R_5$ were employed in such a manner that one terminal of the power source of the bridge circuit was common with one terminal of the power source of the amplifying circuit including the differential D.C. amplifier. The zero adjustment of the output of this amplifying circuit must be carried out by the zero adjustment of the output of the said bridge circuit, and therefore, entirely the same defects in the latter procedures as described above are unavoidable in this envent also.

GENERAL DESCRIPTION AND SUMMARY OF THE INVENTION

It is, therefore, an object of the present invention to provide an improved, unique and simple circuit for accurately detecting a physical quantity.

It is another object of the present invention to provide an improved, unique and simple circuit comprising a variable resistor means having a resistor connected to a first predetermined arm of a bridge circuit in parallel, two terminals and a control terminal, thereby compensating the initial unbalanced voltage of said bridge circuit by adjusting the resistance value of said variable resistor means without affecting the characteristic of the thermal zeroshift of said bridge circuit.

It is still another object of the present invention to provide an improved unique and simple circuit further comprising resistor means having a predetermined resistance value connected to a second predetermined arm in parallel which is adjacent to said first predetermined arm, thereby further compensating the characteristic of the thermal zeroshift by selecting the resistance value of said variable resistor means and resistor means.

It is a further object of the present invention to provide an improved unique and simple circuit further comprising amplifier means comprising a differential DC amplifier of which two input terminals respectively are connected to said control terminal of said variable resistor and to the other output terminal of said bridge circuit, and a feedback resistor thereof having a predetermined resistance value, thereby obtaining an amplified output voltage between two output terminals of said amplifier means.

The foregoing and other objects are attained in accordance with a first aspect of the present invention wherein the zero adjustment of bridge output can be carried out without affecting the good characteristics of thermal zeroshift of the full bridge circuit. Additionally, even if the resistance temperature coefficient of the resistance elements at the four arms of the bridge are not equal to each other the compensation of the characteristics of the thermal zeroshift bridge output can be easily realized by selecting the resistance values of the variable resistor means and resistor means to be disposed in parallel. Thus, in in circuit for detecting a physical quantity of the present invention, the temperature compensation once made is not varied by the zero adjusting operation.

According to a second aspect of the present invention, the amplification of the output voltage of the bridge circuit can be carried out by an amplifier means which operates in combination with the circuit for detecting a physical quantity of the first aspect according to the present invention. The zero adjustment and the compensation of the thermal zeroshift of the bridge circuit can be also carried out by the circuit of this second aspect according to the present invention as by the circuit of the first aspect.

Moreover, according to the present invention, the zero point is not shifted when the input voltage is varied, and it is not necessary to open one junction of the bridge circuit. Therefore, if four leads are introduced out of a conventional bridge circuit employing resistance elements for detecting a physical quantity, the circuit for detecting a physical quantity of the present invention may be constructed by reforming the conventional bridge circuit, and then the zero adjustment of the output can be carried out.

The first aspect of the present invention comprises a bridge circuit including four sensitive elements at four respective arms, two input and two output terminals, the sensitive element having resistivity which is variable in proportion to a physical quantity to be applied thereto. Power supply means are connected to the two input terminals of the bridge circuit for applying a voltage thereacross. Also included are variable resistor means which comprise a resistor having a predetermined resistance, two terminals and a control terminal, the two terminals thereof being connected to one input and one output terminal of a first predetermined arm of said bridge circuit, thereby connecting said resistor to said first predetermined arm in parallel. The control terminal divides the voltage of said one output terminal of said first predetermined arm by controlling the position of a tap thereof. The zero adjustment of the output can be carried out by dividing the output voltage of the bridge circuit without affecting the characteristic of the thermal zeroshift of the bridge circuit.

Another embodiment of the first aspect of the present invention further comprises a resistor means having a predetermined value connected to a second predetermined arm in parallel which is adjacent to said first predetermined arm. This embodiment also accomplishes a zero adjustment without any change of characteristic of the thermal zeroshift of the bridge circuit, and may be constructed as follows. One terminal of the variable resistance is connected with one output terminal of the full bridge circuit including the resistance elements at the respective arms. The other terminal of the variable resistance is connected with the one input terminal which is selected in accordance with the polarity of the initial unbalanced voltage of the full bridge circuit through the first fixed resistance. The second fixed resistance is disposed in parallel with the arm adjacent to that at which the said variable resistance and the first fixed resistance are disposed in parallel, and the control terminal of said variable resistance and the other output terminal of said bridge circuit are the output terminals of this circuit for detecting a physical quantity. The zero adjustment of output can be carried out by adjusting the resistance value of the variable resistance. In this circuit having the construction as described above, the characteristics of thermal zeroshift of the said full bridge circuit is not affected, and compensation can be realized by suitably selecting the series resistance value of the said variable resistance and the first fixed resistance of the variable resistor means and the value of said second fixed resistance as the resistor means.

The zero point adjusting range of the circuit for detecting a physical quantity according to the foregoing is limited to either positive side or negative side. On the contrary, in another embodiment of the first aspect according to the invention, the zero adjustment can be carried out both in the positive side and the negative side. Namely, one end of the first fixed resistance and second fixed resistance mutually connected in series and that of the third fixed resistance and fourth fixed resistance mutually connected in series are connected with one of the output terminals of the full bridge circuit, the other ends thereof being respectively connected with two input terminals. The variable resistance is connected between the junction of the first and second fixed resistances and the junction of the third and fourth resistances, and the control terminal of the variable resistance and the other output terminal of the full bridge circuit are made to be the output terminals of this circuit for detecting a physical quantity. Then the zero adjustment of the output can be carried out by adjusting the variable resistance. Thus, entirely the same operating effect as that of the first embodiment can be realized by suitably selecting both the series resistance value of the first and second fixed resistances and that of the third and fourth resistances. This circuit is also practically useful for detecting a physical quantity, having characteristics that the construction must not be changed in accordance with the polarity of the initial unbalanced voltage of the said full bridge circuit.

The first group of embodiments of the second aspect according to the present invention is constructed as follows. A full bridge circuit is formed by disposing resistance elements at the respective arms. One terminal of a variable resistor is connected with one output terminal of the full bridge circuit, the other terminal of the variable resistor being connected with one input terminal thereof which is selected depending on the polarity of the initial unbalanced voltage of the bridge circuit, through a first fixed resistor. The other output terminal of the bridge circuit and a control terminal of the variable resistor are respectively connected with two input terminals of a differential DC amplifier having a power source one terminal of which is common with one of the input terminals of the bridge circuit. A feedback resistor is disposed between one end of the output terminal of the bridge circuit and the output terminal of the differential DC amplifier to provide negative feedback. If necessary, a second fixed resistor is connected in parallel with a suitable arm of the bridge circuit. The output of the bridge circuit is amplified by the differential DC amplifier, and the initial unbalanced voltage of the amplifier is compensated by dividing the output voltage of the bridge circuit by means of the adjustment of the resistance value of said variable resistor of said variable resistor means.

Thus, a practically useful circuit for detecting a physical quantity having the following advantages can be realized. Namely, the zero adjustment is carried out by controlling the position of the control terminal (tap) of the variable resistor without changing the resistance value applied to the gage element of the bridge circuit. Thus, the characteristics of the thermal zeroshift of the bridge circuit will not be affected by the zero adjustment.

Furthermore, the present invention may compensate for the characteristics of the thermal zeroshift by selecting the resistance value of the variable resistor and fixed resistor of the variable resistor means and the feedback resistor of the amplifier means (comprising a differential DC amplifier). As is evident from FIG. 6B, showing the equivalent circuit of the circuit in FIG. 6A, since the total resistance value of the variable resistor and fixed resistor of the variable resistor means applied to one gage element is selected in accordance with the resistance temperature coefficient of the one gage element and the resistance value of the feedback resistor is selected in accordance with the resistance temperature coefficient of the other gage element provided at an arm which is adjacent to the predetermined arm having the one gage element, the characteristics of the thermal zeroshift of the bridge circuit is carried out.

The second group of embodiments of the second aspect according to the present invention is characterized in that the zero adjustment of the output of the circuit for detecting a physical quantity can be carried out both in the positive side and in the negative side, in contrast that the zero adjustment according to the first group of embodiments is limited to either the positive side or the negative side, and the circuit construction must be partially changed corresponding to the polarity of the initial unbalanced voltage of the output of the bridge circuit. The second group of embodiments according to the second aspect of the present invention is constructed as follows: first and second fixed resistors connected in series and the third and fourth resistors connected in series are respectively connected between one output terminal and two input terminals of the bridge circuit. A variable resistor is connected between a junction of the first and second fixed resistors and that of the third and fourth fixed resistors, the control terminal of the variable resistance and the other output terminal of the bridge circuit being respectively connected with two input terminals of the differential DC amplifier, the remaining structure being equivalent to that of the first group described hereinabove. According to the circuit for detecting a physical quantity of the second group, entirely the same operating effect as that of the first group can be realized by suitably selecting the series resistance values of the first and second fixed resistors and of the third and fourth fixed resistors, and the value of the fifth fixed resistance. The zero adjustment of the output can be carried out whether the initial unbalanced voltage of the output of the bridge circuit is positive or negative, and thus its applicable range is made to be wider than the case of the first group of embodiments.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
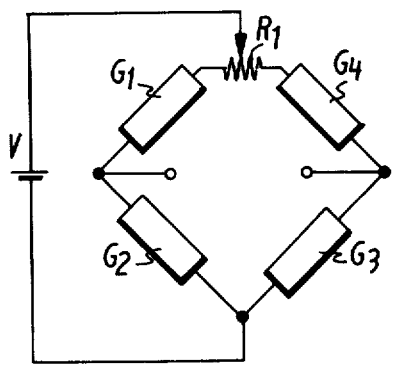
FIG. 1 and FIG. 2 are circuit diagrams helpful in illustrating conventional prior art methods of zero adjustment of the output of a bridge circuit.
Figure 2:
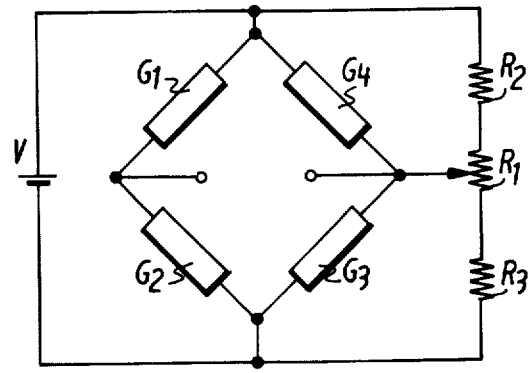
Figure 3:
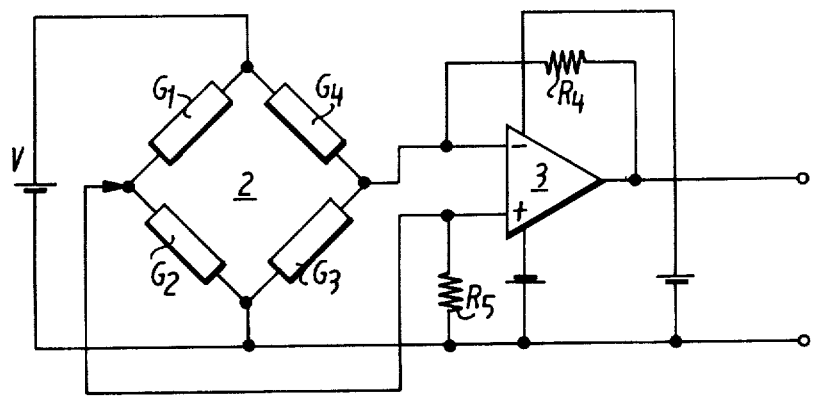
FIG. 3 is a circuit diagram helpful in illustrating a conventional method of amplifying the bridge circuit.
Figure 4:
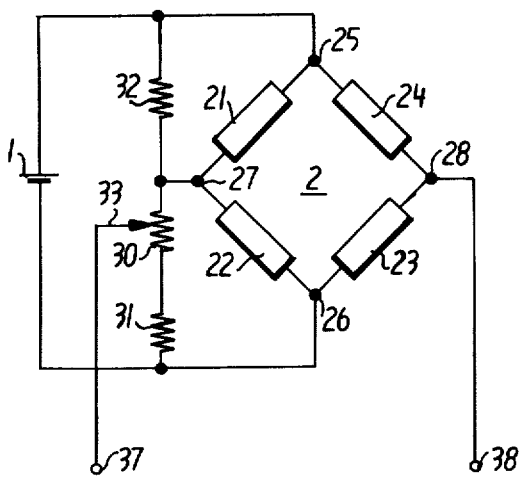
FIG. 4 is a circuit diagram of one preferred embodiment according to a first aspect of the present invention.

Referring now to the drawings, wherein like reference numerals designate identical or corresponding parts throughout the several views, and more particularly to FIG. 4 thereof, a first preferred embodiment of a circuit for detecting a physical quantity is illustrated in accordance with the first aspect of the present invention.

The circuit of FIG. 4 for detecting a physical quantity comprises a bridge circuit 2 which is a full bridge circuit comprised of the diffused semiconductor strain gauge elements 21 to 24 formed on a flexible silicon diaphragm of the pressure transducers (not shown). One pair of the terminals 25 and 26 opposing each other are used as the input terminals of the source, source 1 being connected between terminals 25 and 26, and another pair of terminals 27 and 28 are used as the output terminals. The strain gauge elements 21 to 24 are disposed on the diaphragms in such a condition that the element pair 22, 24 or 21, 23 are respectively made to be inactive when element pair 21, 23 or 22, 24 are made to be active, and also such that the element pair 22, 24 or 21, 23 respectively undergo compression when the element pair 21, 23 or 22, 24 are in tension.

It will be assumed for ease of explanation that there is an initial unbalanced voltage in the circuit of this embodiment such that the voltage at the output terminal 27 is higher than the voltage at the output terminal 28 based on the unbalance of the resistance values, which unbalance initially exists among the strain gauge elements 21 to 24. For convenience, this initial unbalanced voltage is regarded as positive, and hereafter, such a condition as described above will merely be expressed as a positive initial unbalanced voltage. Also, in the circuit of this embodiment, it will be assumed that there is little change of the zero point relative to the temperature change of the bridge output; namely, the thermal zeroshift of the bridge circuit 2 obtained between the output terminals 27 and 28. Such characteristics as described above frequently occur when diffused semiconductor strain gauge elements are employed. Even if the resistance temperature coefficients of said element are very well arranged in order, slight inequalities among the resistance values tends to occur.

Moreover, in the circuit of this embodiment, one terminal of the variable resistance 30 is connected with one output terminal 27 of the bridge circuit 2 while the other terminal of variable resistance 30 is connected with the negative input terminal 26 through the first fixed resistance 31. The second fixed resistance 32 is connected between one output terminal 27 and the positive input terminal 25. Thus, the control terminal 33 of the variable resistance 30 and the other output terminal 28 of the bridge circuit 2 are employed as the output terminals 37, 38 of the circuit for detecting a physical quantity of this first embodiment.

In this case, the series resistance value represented by $R_{30} + R_{31}$ of the variable resistance 30 and the first fixed resistance 31, respectively, is equal to the resistance value $R_{32}$ of the second fixed resistance 32, and is relatively larger than the resistance values $R_{21}$ to $R_{24}$ of the strain gauge elements 21 to 24. By way of example in this embodiment, it can be assumed that $R_{21}$ to $R_{24}$ are each about 1k$\Omega$, $R_{30}$ is 1k$\Omega$, $R_{31}$ is 9k$\Omega$, and that $R_{32}$ is 10k$\Omega$.

The operation of the circuit for detecting a physical quantity having the above construction will now be explained. The DC voltage is applied between the input terminals 25 and 26 from the source 1, and when the pressure to be detected operates on the diaphragms of the pressure transducers, the resistance values of the diffused semiconductor strain gauge elements 21 to 24 are varied in proportion to said pressure due to the piezo-resistive effect based on the strain of the diaphragms caused by pressure, and a voltage proportional to the pressure is taken out between the output terminals 27 and 28. As described above, the bridge circuit 2 of this embodiment has characteristics such that the initial unbalanced voltage thereof is positive and little thermal zeroshift is taken out in response to the temperature change. The variable resistance 30 and the first fixed resistance 31 are connected in series and the second fixed resistance having a resistance value equal to the series resistance value of the variable resistance 30 and the first fixed resistance 31 are respectively connected in parallel with the strain gauge elements 22 and 21. As a result the sensitivity of the output obtained between the output terminals 27 and 28 relative to the pressure is a little decreased, but the value of the initial unbalanced voltage hardly changes. The resistance temperature coefficients of the arm including the strain gauge elements 22 and 21 are changed at a nearly equal rate with respect to each other, and the difference between the respective temperature coefficients of resistances does not occur, and therefore, the characteristics of thermal zeroshift are never affected. Next, at both ends of the variable resistance 30, a voltage value is applied which is obtained by dividing the voltage always applied to the arm having the strain gauge element 22 in accordance with the ratio of the variable resistance 30 and the first fixed resistance 31. Therefore, the voltage at the control terminal 33 of the variable resistance 30 can be freely lowered, compared with the voltage at the output terminal 27 by values ranging from zero to the divided resistance value depending on the position of the control terminal 33, relative to the other output terminal 28 of the bridge circuit. Therefore, the initial unbalanced voltage of the bridge circuit 2 is regulated to zero by adjusting the variable resistance 30 and between the output terminals 37 and 38 and output can be obtained nearly equal to the voltage based on the resistance change of the strain gauge elements 21 to 24 of the bridge circuit 2 responsive to the physical quantity change. Additionally, good characteristics of the thermal zeroshift of the bridge circuit are never varied. The initial unbalanced voltage of the bridge circuit 2 is changed in proportion to the input voltage Vi applied to the input terminals 25 and 26, and the divided voltage is also changed in proportion to Vi. Thus, even if Vi is varied, the once adjusted zero point of the output of the circuit for detecting a physical quantity of this embodiment will not be shifted.

In this embodiment, the maximum voltage of the zero adjustment is about $$\tfrac{1}{2} Vi \times \left( \frac{R_{30}}{R_{30} + R_{31}} \right)$$

(approximately 1/20 Vi), because the voltage applied to the arm including the strain gauge element 22 is about ½ Vi. In the circuit of this embodiment, the initial unbalanced voltage of the bridge circuit 2 can be varied from 0 to $-$ 1/20 Vi, and therefore the zero adjustment can be effectively carried out in the case where the initial unbalanced voltage of the bridge circuit 2 is from 0 to $+$ 1/20 Vi.

As per the above description, the range of zero adjustment of the circuit for detecting a physical quantity is limited to the negative side, namely from 0 to $-$ 1/20 Vi, but when one terminal of the first fixed resistance 31 of the circuit is connected with the plus input terminal 25 instead of being connected with the minus input terminal 26, and one terminal of the second fixed resistance 32 is connected with the minus input terminal 26 instead of being connected with the plus input terminal 25, the range of zero adjustment can be drifted to the positive side, namely from 0 to $+$ 1/20 Vi, and in this case, the zero adjustment can be effectively carried out in the bridge circuit 2 whose initial unbalanced voltage is from 0 to $-$ 1/20 Vi.

Moreover, in the circuit of this embodiment, the second fixed resistance 32 is connected in parallel with the strain gauge element 21, but it is also to be connected in parallel with the strain gauge element 23 at the arm opposing element 21, as a modified embodiment. Similarly, the variable resistance 30 and the first fixed resistance 31 can also be connected in parallel with the strain gauge element 24 at the arm opposing element 22; e.g., one terminal of the variable resistance 30 is connected with the other output terminal 28 of the bridge circuit 2, the other terminal is connected with the plus input terminal 25 through the first fixed resistance 31, and the control terminal 33 of the variable resistance 30 and one output terminal 27 are employed as the output terminals of the circuit for detecting a physical quantity, and thus entirely the same operating effect as that of the circuit of the first embodiment can be achieved.

According to this embodiment, the variable resistance 30 and the first fixed resistance 31 are connected in parallel with the resistance element 22 of the bridge circuit 2, but the same effect can be achieved by using one variable resistance instead of two resistances.

Figure 5:
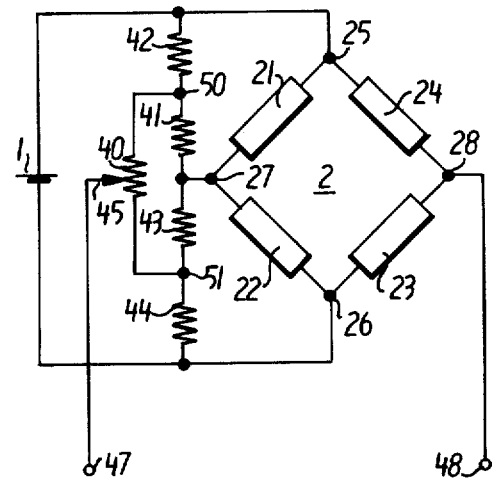
FIG. 5 is a circuit diagram of another preferred embodiment according to the first aspect of the present invention.

Referring now to FIG. 5, a second embodiment of a circuit for detecting a physical quantity according to the first aspect of the present invention is illustrated. According to this second embodiment, the zero adjustment can be performed, whether the polarity of the initial unbalanced voltage between the output terminals 27 and 28 of the bridge circuit 2 consisting of the strain gauge elements 21 to 24 and of the source 1 is either positive or negative. Therefore, it is unnecessary to consider the polarity of the initial unbalanced voltage. In the second embodiment shown in FIG. 5, a first fixed resistance 41 is connected with a second fixed resistance 42 in series, the other terminal of the first fixed resistance 41 being connected with one output terminal 27, and the other terminal of the said second fixed resistance 42 being connected with the plus input terminal 25 of the bridge circuit 2. A third fixed resistance 43 is connected with a fourth fixed resistance 44 in series, the other terminal of the third fixed resistance 43 being connected with one output terminal 27, and the other terminal of the fourth fixed resistance 44 being connected with the minus input terminal 26. A variable resistance 40 is connected between a junction 50 of the first and second fixed resistances 41 and 42, and a junction 51 of the third and fourth fixed resistances 43 and 44. A control terminal 45 of the variable resistance 40 and the other output terminal 28 of the bridge circuit 2 are employed as output terminals 47 and 48 of the circuit for detecting a physical quantity of this embodiment. In this case, the series resistance value $R_{41} + R_{42}$ of the first and second resistances 41 and 42 respectively is made equal to the series resistance value $R_{42} + R_{44}$ of the third and fourth fixed resistances 43 and 44, respectively, which value is relatively higher than the resistance value $R_{21}$ to $R_{24}$ of the strain gauge elements 21 to 24. In an example of a circuit of this embodiment, $R_{21}$ to $R_{24}$ are about 1kΩ, $R_{41}$ and $R_{43}$ are 1kΩ, $R_{42}$ and $R_{44}$ are 9kΩ, and $R_{40}$ (the value of the variable resistance 40) is, 2kΩ.

The operation of the circuit for detecting a physical quantity of the second embodiment having the foregoing construction will now be explained. The operation and characteristics of the bridge circuit 2 are entirely the same as those of the circuit of the first embodiment of FIG. 4, except that the initial unbalanced voltage thereof may be either positive or negative. The first and second fixed resistances 41 and 42 mutually connected in series and the third and fourth resistances 43 and 44 mutually connected in series are respectively connected with the strain gauge elements 21 and 22 in parallel. Therefore, similar to the case of the circuit of the first embodiment, the sensitivity of the output obtained between the output terminals 27 and 28 responsive to the pressure is a little lowered, but the initial unbalanced voltage is little changed, and also the characteristics of thermal zeroshift are never affected. The voltage which is obtained by dividing the voltage applied to the arm including the strain gauge element 21 in accordance with the ratio of the first fixed resistance 41 and the second fixed resistance 42 always appears between both terminals of the first fixed resistance 41. Additionally, the voltage which is obtained by dividing the voltage applied to the arm including the strain gauge element 22 in accordance with the ratio of the third fixed resistance 43 and the fourth fixed resistance 44 always appears between both terminals of the third fixed resistance 43. The variable resistance 40 is connected between the junction 50 of the first and second fixed resistances 41 and 42 and the junction 51 of the third and fourth fixed resistances 43 and 44. Consequently, the value divided with the first and second fixed resistances 41 and 42 and the value divided with the third and fourth fixed resistances may be respectively made low. However an arbitrary value can be obtained at the control terminal 45 of the variable resistance 40 depending on the position of the control terminal 45, the value ranging from a higher to a lower value than the value at one output terminal 27 by the value divided with the fixed resistances 41 and 42, relative to the other output terminal 28 of the bridge circuit 2. Thus the initial unbalanced voltage of a positive or negative polarity of the bridge circuit 2 is adjusted to zero by adjusting the variable resistance 40, and then the output, nearly equal to the voltage based on the resistance change responsive to the change of the physical quantity of the strain gauge elements 21 to 24, can be obtained between the output terminals 47 and 48 of the circuit for detecting a physical quantity of this embodiment, and also the good characteristics of thermal zeroshift of the bridge circuit are never varied.

As is apparent from the explanation described above, the circuit of this embodiment is characterized in that the zero adjustment range is from the positive side to the negative side. In the circuit of the first embodiment, it is necessary to select properly to which strain gauge elements the variable resistance 30 and the first fixed resistance 31 should be connected in parallel, depending on the polarity of the initial unbalanced voltage of the output of the bridge circuit 2. On the contrary, in the circuit of the second embodiment, it is not necessary to select the construction depending on the polarity of the initial unbalanced voltage. In the circuit of this embodiment, the range of the zero adjustment is from about $+ 1/40$ Vi to $- 1/40$ Vi, and therefore, the zero adjustment can be effectively carried out in the bridge circuit of which the initial unbalanced voltage is from $- 1/40$ Vi to $+ 1/40$ Vi. Also, the adjusted zero point of the output of the circuit of this embodiment will not be affected by the variation of Vi, the same as in the case of the circuit of the first embodiment.

In the circuit of this embodiment, one end of the first fixed resistance 41 and that of the third fixed resistance 43 are connected with one output terminal 27 of the bridge circuit 2. Alternatively, the said ends may be connected with the other output terminal 28 of the bridge circuit 2, and also the output terminal 27 and the control terminal 45 of the variable resistance 40 may be used as the output terminals of the circuit for detecting a physical quantity.

In the circuits of the first and second embodiments explained in detail above, it was assumed that the thermal zeroshift of the bridge circuit 2 was very small. But the present invention is not limited to such a case. For example, in the temperature compensated bridge circuit of the conventional method that the compensating resistance having a suitable value is added to one strain gauge element in parallel or series, the initial unbalanced voltage value caused by the connection of the compensating resistance in addition to the original unbalance of resistance value of the strain gauge elements, can be adjusted to zero, without the drop of the characteristics of the thermal zeroshift after the compensation. And also, in the bridge circuit generating the thermal zeroshift as the result of the inequalities of the resistance temperature coefficients of the strain gauge elements at four arms, the compensation of the thermal zeroshift can be achieved by properly selecting the series resistance value of the variable resistance and the first fixed resistance, and the value of the second fixed resistance in the case of the circuit of the first embodiment, and the series resistance value of the first and second fixed resistance and that of the third and fourth fixed resistances in the circuit of the second embodiment (in the circuit of the first embodiment, the second fixed resistance may be made infinite, i.e., it may be omitted). After this process, the zero adjustment of the output can be carried out by adjusting the variable resistance, which will be well understood by one ordinary skilled in the art.

Figure 10:
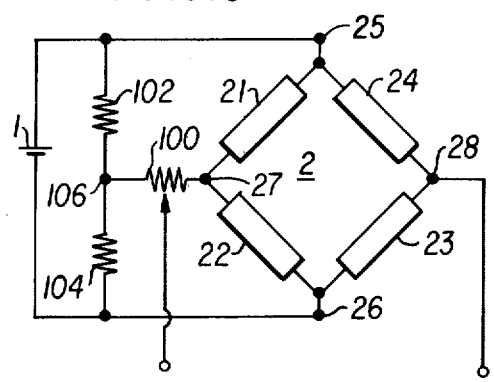
FIG. 10 is a circuit diagram of yet another embodiment of the present invention.

Other modifications of the first aspect according to the present invention may be realized. For example, as shown in FIG. 10 the variable resistor means may comprise a variable resistor 100 connected to one output terminal 27 of a first predetermined arm and a fixed resistor 102 connected to the variable resistor and one input terminal 25 of the first predetermined arm, while the resistor means (resistor 104) is connected to a contact 106 between the variable resistor 100 and fixed resistor 102 of the variable resistor means and the other input terminal 26 of the bridge circuit. Thus, the resistor means are connected to the input terminal through the variable resistor of the variable resistor means. The example shown in FIG. 10 may be useful in a special case.

Therefore, according to the present invention, the zero adjustment of the output can be carried out without increasing thermal zeroshift with the bridge circuit having small characteristics of thermal zeroshift or with the bridge circuit of which temperature compensation is already achieved by another method. Additionally, the temperature compensation of the thermal zeroshift and the zero adjustment can be operated simultaneously and independently with the bridge circuit generating thermal zeroshift.

In each of the circuits of the embodiments described above, the constant voltage source is employed as the source 1. According to the present invention, the adjusted zero point of the output is not affected by the variation of the input voltage Vi of the bridge circuit. Therefore, it is apparent that even if the circuit is constructed so that the voltage Vi may have suitable temperature characteristics employing the constant current source or the other method for the purpose of the temperature compensation of the output sensitivity of the bridge circuit, the zero point of output will not be shifted.

Moreover, an object of the circuits of the embodiments described above was to adjust the initial unbalanced voltage of the bridge circuit to zero, but the present invention is not limited to this operation. Also, the arbitrary offset voltage can be obtained as the output, and in this case, the characteristics of the thermal zeroshift of the bridge circuit will not be affected.

In the circuits described above, the zero adjustment of the output was carried out by employing a variable resistance, but the variable resistance can be replaced by two fixed resistances equivalent thereto after the adjustment is accomplished. Also, the description was made in connection with semiconductor strain guage elements as the resistance elements included in the respective arms of the bridge circuit. But the present invention is not so limited. For example, other resistance elements such as wire strain gauge elements, magneto-resistance elements, and photo-resistance elements or the like, can be employed.

In summary, the first aspect of the present invention provides a circuit for detecting a physical quantity, by which the initial unbalanced voltage can be adjusted to zero, without opening one junction of the full bridge circuit, adjusting a variable resistance. According to this first aspect of the present invention, the characteristics of thermal zeroshift of the full bridge circuit is not affected, and moreover temperature compensation can be achieved thermal zeroshift of simultaneously with the temperature zero adjustment.

Figure 6A:
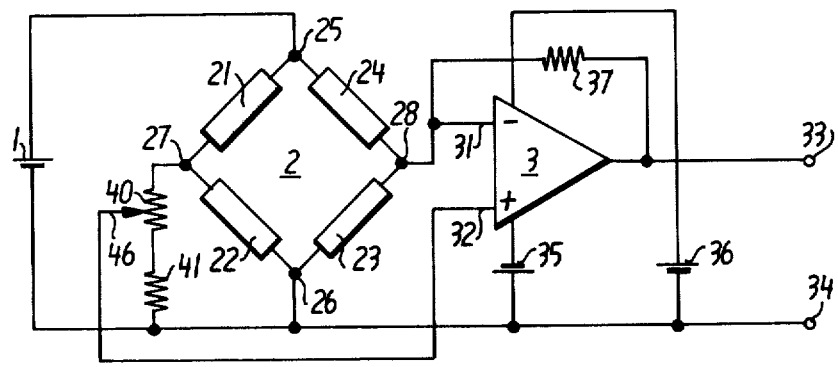
FIG. 6A is a circuit diagram of a first preferred embodiment according to a second aspect of the present invention.

Hereinafter, the first group comprising first, second and third preferred embodiments of the second aspect according to the present invention will be explained in detail with reference to FIGS. 6 through 8, respectively. FIG. 6A shows a first embodiment of a circuit for detecting a physical quantity of the second aspect according to the present invention. The diffused semiconductor strain guage elements 21 to 24, formed on a flexible silicon diaphragm of a pressure transducer (not shown) are disposed at four arms of the bridge circuit 2. The terminal 25 is connected with the positive terminal of the bridge power source 1 as the positive input terminal of the bridge circuit. The terminal 26 is connected with the negative terminal of the power source as the negative input terminal 6 thereof. Terminal 27 is used as the positive output terminal and terminal 28 is used as the negative output terminal. Thus between the output terminals 27 and 28 the voltage based on the resistance changes of the strain guage elements can be obtained.

Elements 21 to 24 are disposed on the diaphragm so that if the elements 21 and 23 are active, the elements 22 and 24 are inactive, and vice versa. Also, if the elements 21 and 23 receive compression strain, the elements 22 and 24 receive tension strain, and vice versa.

With respect to the circuit of this embodiment shown in FIG. 6A, even if there exists an initial unbalanced voltage which is generated because of the resistance values at four arms of the bridge circuit, or because of the insertion of a compensating resistor which will be described hereafter, the operation of this circuit is unaffected. In this case, it is assumed that the circuit of this embodiment has a positive initial unbalanced voltage and that the voltage at the output terminal 27 is higher than the voltage at the output terminal 28. It is also assumed that the change of the zero point of the output, namely the thermal zeroshift based on the temperature change of the bridge 2 is very small, or that it is previously compensated by inserting a compensating resistor (not shown) in series or parallel with the strain gauge element at the suitable arm of the bridge circuit.

One terminal of the variable resistor 40 is connected to the positive output terminal 27 of the bridge circuit 2, and the other terminal of the variable resistor 40 is connected with the negative input terminal 26 through a first fixed resistor 41. The control terminal 46 of the variable resistor 40 and the negative output terminal 28 of the bridge circuit 2 are respectively connected with the positive input terminal 32 and the negative input terminal 31 of a differential DC amplifier 3 driven by two power sources 35 and 36, one end of which are in common. The negative input terminal 26 of the bridge circuit 2 is connected with a common terminal 34 of the two power sources 35 and 36, and a feedback resistor 37 is disposed between the output terminal 33 of the differential DC amplifier 3 and the negative output terminal 28 of the bridge circuit. The output terminal 33 and the common terminal 34 are used as the output terminals of the circuit for detecting a physical quantity of this embodiment.

The series resistance value of the variable resistor 40 and the first fixed resistor 41 is made to be equal to the value of the feedback resistor 37. The resistance values $R_{21}$ to $R_{24}$ of the strain gauge elements 21 to 24, the respective values $R_{37}$, $R_{40}$, $R_{41}$ of the feedback resistor 37, the variable resistor 40, and the first fixed resistor 41 can be selected in one example as follows: $R_{21}$ to $R_{24}$ about 1K$\Omega$; $R_{37} = 10$K$\Omega$; $R_{40} = 1$k$\Omega$; and $R_{41} = 9$K$\Omega$.

Hereafter, the operation of the circuit for detecting a physical quantity of the first embodiment of the second aspect according to the present invention constructed as described above will now be explained.

Figure 6B:
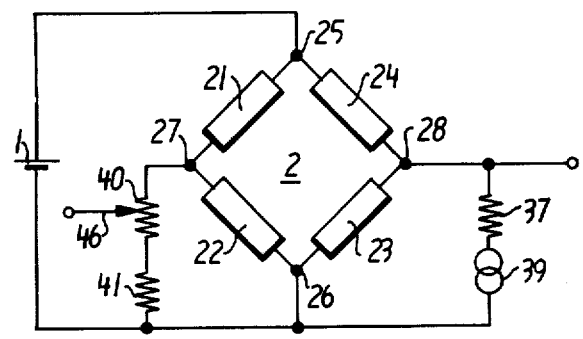
FIG. 6B is a circuit diagram of an equivalent bridge circuit to that shown in FIG. 6A.

The characteristics of thermal zeroshift and the method of the zero adjustment of the circuit of this embodiment will be explained according to an equivalent bridge circuit to that FIG. 6A shown in FIG. 6B. The input impedance of the differential DC amplifier 3 is generally much higher than the resistance values $R_{21}$ to $R_{24}$ of the strain gauge elements, so differential DC amplifier 3 may be omitted from the equivalent circuit of FIG. 6B. The variable resistor 40 and the first fixed resistor 41 are connected in parallel with the strain gauge element 22, the same as in the case of FIG. 6A, and one end of the feedback resistor 37 is connected with the negative output terminal 28 of the bridge circuit 2, and the other end of the said feedback resistor 37 is connected with the negative input terminal 26 through the constant voltage source 39.

In the equivalent circuit both the resistance temperature coefficients of the arm including the strain gauge element 22 and that of the arm including the strain gauge element 23 are varied in nearly equal condition to each other, and the difference between the resistance temperature coefficients does not occur. Therefore, the characteristics of the thermal zeroshift are not affected thereby.

The zero adjustment method will now be explained. The differential DC amplifier operates so as to make the voltage between the control terminal 46 of the variable resistor 40 and the negative output terminal 28 of the bridge circuit equal to zero, and the voltage in response to that at the input terminals appears at the output terminals thereof.

If the voltage applied to the input terminals 31 and 32 of the differential DC amplifier 3 is controlled by adjusting the position of the control terminal (tap) of the variable resistor 40 so as to make the voltage across the output terminals 33 and 34 be zero, the initial unbalanced voltage of the bridge circuit can be compensated for and the zero adjustment of the output can be achieved. A DC voltage is supplied from the bridge power source 1 across the input terminals 25 and 26 of the bridge circuit 2. The pressure to be detected is applied to the diaphragm of the pressure transducer, then the strain of the diaphragm occurs and the resistance values of the diffused semiconductor strain gauge elements 21 and 24 are varied proportionally to the pressure due to the piezoresistive effect. The voltage proportional to the pressure is taken across output terminals 27 and 28. The differential DC amplifier 3 operates to flow the necessary current to or from the negative output terminal 28 of the bridge circuit 2 through the feedback resistor 37, and make the voltage applied to input terminals 31 and 32 nearly zero constantly. As a result, the same voltage Vo is obtained at the output terminals 33 and 34. This voltage is an amplified version of the output voltage of the bridge circuit proportional to the applied pressure, the value Vo approximately represented by:

$$V_o = 2 \frac{\Delta R}{R^2} R_{37} \quad V_i = 2 V_{Bo} \frac{R_{37}}{R}$$

where
R = the resistance value of the strain gauge element;
$\Delta R$ = the resistance change of the strain gauge element caused by the applied pressure;
Vi = the voltage across the input terminals of the bridge circuit 2; and
$V_{Bo}$ = the unbalanced voltage across the output terminal. In one example of this embodiment, R is 1K$\Omega$ and $R_{37}$ is 10K$\Omega$, and therefore, the output will be amplified to a value about 20 times that of the unbalanced voltage. Therefore, according to the circuit of this embodiment, the amplified output responds exactly to the change of the physical quantity.

The voltage value obtained by dividing the voltage applied to the arm including the strain guage element 22 in accordance with the ratio of the variable resistor 40 and the first fixed resistor 41 appears at both ends of the variable resistance 40. Therefore the voltage at the control terminal 46 of the variable resistor 40 can be made to be lower at will than the value at the positive output terminal 27 ranging from zero to the divided voltage value, depending on the position of the control terminal 46. Thus, by adjusting the variable resistor 40, the initial unbalanced voltage of the bridge circuit 2 is adjusted to zero, and the output nearly equal to the voltage caused by the resistance change due to the change of the physical quantity of the strain gauge elements 21 to 24 of the bridge circuit 2 can be obtained at the control terminal 46 and the negative output terminal 28. Additionally, good characteristics of the thermal zeroshift of the bridge circuit 2 is never varied. Moreover, since the initial unbalanced voltage of the bridge circuit 2 is proportional to the input voltage Vi applied to the input terminals 25 and 26, and the divided voltage is also proportional to Vi, the adjusted zero point between the control terminal 46 and the negative output terminal 28 will not be shifted, even if Vi is varied.

In this embodiment, since the voltage applied to the arm including the strain gauge element 22 is about ½ Vi, the upper limit of the zero adjusting range of the output at the control terminal 46 and the negative output terminal 28 is about $$\frac{1}{2} V_i \times \frac{R_{40}}{R_{40} + R_{41}}, \text{ or about } \frac{1}{20} V_i.$$

The initial unbalanced voltage of the bridge circuit can be varied from 0 to $-1/20$ Vi. Therefore, the zero adjustment can be effectively carried out with the bridge circuit 2 having an initial unbalanced voltage from 0 to $+ 1/20$ Vi.

Thus the zero adjustment of a bridge circuit having a positive initial unbalanced voltage, and having good characteristics of thermal zero-shift can be achieved by adjusting variable resistance 40. The zero point of the output will not vary even if the input voltage of the bridge circuit is changed. Also, the output will be stable against a variation in temperature.

Referring now to FIG. 7, a second embodiment of the present invention in accordance with the second aspect thereof is illustrated wherein the zero adjustment can be performed with a bridge circuit having a positive unbalanced voltage.

Figure 7A:
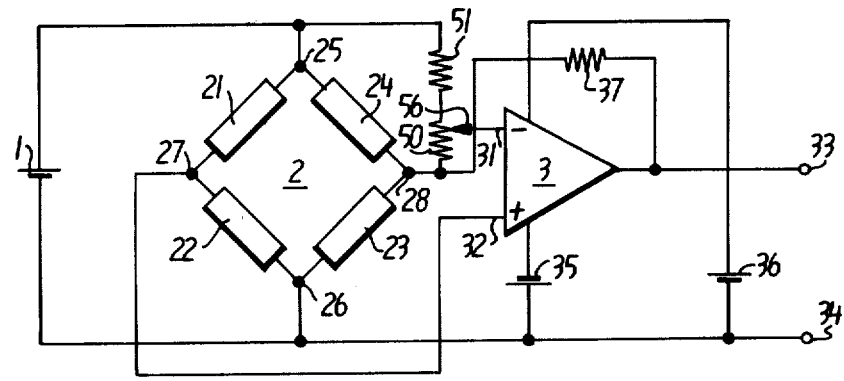
FIG. 7A is a circuit diagram of a second preferred embodiment according to the second aspect of the present invention.

In FIG. 7A, the arm to which the variable resistor and the first fixed resistor are connected is different from the arm utilized in the first embodiment as seen in FIG. 6A. Therefore, the connection of the input terminals of the differential DC amplifier is different than that of the first embodiment. One end of the variable resistor 50 is connected to the negative output terminal 28 of the bridge circuit 2 having good or compensated characteristics of the thermal zeroshift and of the positive initial unbalanced voltage, and the other end of the variable resistor 50 is connected to the positive input terminal 25 through the first fixed resistor 51. The control terminal 56 of the variable resistor and the positive output terminal 27 of the bridge circuit 2 are respectively connected to the negative input terminal 31 and the positive input terminal 32 of the differential DC amplifier 3. The other connections are equivalent to those of the circuit of the first embodiment, and need not be repeated. The resistance values in an example of the circuit of this embodiment may be as follows: $R_{21}$ to $R_{24}$ = about 1KΩ; $R_{37}$ = 10KΩ; $R_{50}$ = 1KΩ; and $R_{51}$ = 9KΩ.

Figure 7B:
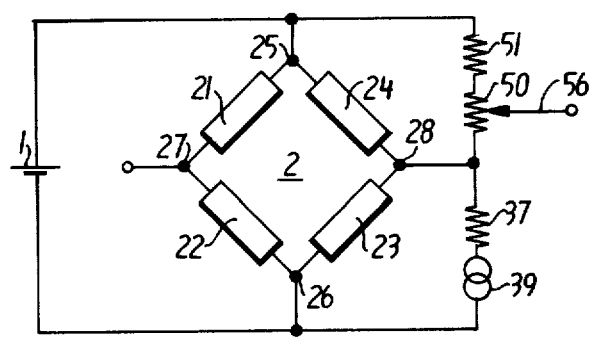
FIG. 7B is a circuit diagram of an equivalent bridge circuit to that shown in FIG. 7A.

The operation of the circuit for detecting a physical quantity of the second embodiment constructed as described above will now be explained. The amplifying operation of the voltage of the bridge circuit 2 by means of the differential DC amplifier 3 is entirely the same as that of the circuit of the first embodiment. Therefore, the output amplified to a value about 20 times of the voltage is obtained at the output terminals 33 and 34 of the circuit of this embodiment. FIG. 7B is the equivalent bridge circuit of FIG. 7A of the second embodiment. FIG. 7B differs from the equivalent circuit of the first embodiment in that the variable resistor 50 and the first fixed resistor 51 connected in series are connected to the strain gauge element 24 in parallel. However, since the series resistance value of the variable resistor 50 and the first fixed resistor 51 is equal to the value of the feedback resistor 37, the initial unbalanced voltage of the output obtained across the output terminals 27 and 28 hardly varies, and the characteristics of the thermal zeroshift are not changed. The voltage applied to the arm having the strain gauge element 24 is divided in accordance with the ratio of the variable resistor 50 and the first fixed resistor 51. This divided voltage is always obtained at both ends of the variable resistor 50, so the output voltage obtained at the control terminal 56 of the variable resistor 50 is always higher than the value at the negative output terminal by an arbitrary value ranging from zero to the divided value depending on the position of the control terminal 56. Thus, a zero adjusted output can be obtained across the control terminal 56 and the positive output terminal 27 by adjusting the variable resistor 50 so that the initial unbalanced voltage of the bridge circuit 2 is made zero and the temperature characteristics of the zero point is good as well as having good characteristics of the thermal zeroshift of the output of the bridge circuit 2. The zero adjusting range of the circuit of this embodiment is from 0 to −1/20 Vi, the same as in the case of the circuit of the first embodiment, and the zero adjustment can be effectively performed with the bridge circuit 2 having the initial unbalanced voltage from 0 to +1/20 Vi. Thus the output having good characteristics of the thermal zeroshift is obtained at the output terminals 33 and 34 of the circuit of this embodiment. Additionally, the voltage of the bridge circuit 2 due to the variation of the physical quantity thereof is amplified and at the same time, zero adjustment of the output can be carried out by means of the variable resistor 50. Also, the zero point of the output will not vary even if the input voltage of the bridge circuit is varied.

Figure 8A:
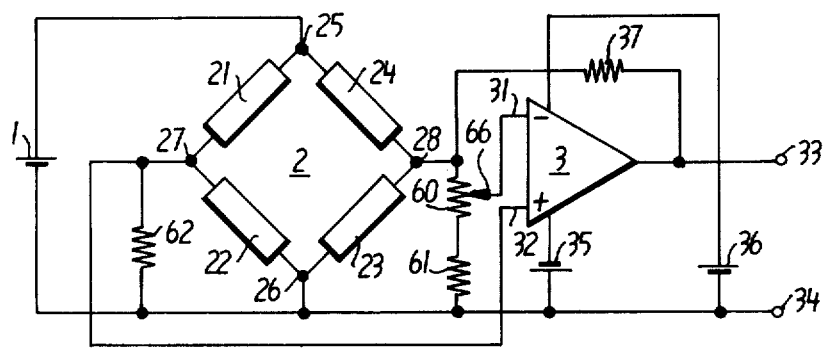
FIG. 8A is a circuit diagram of a third preferred embodiment according to the second aspect of the present invention.
Figure 8B:
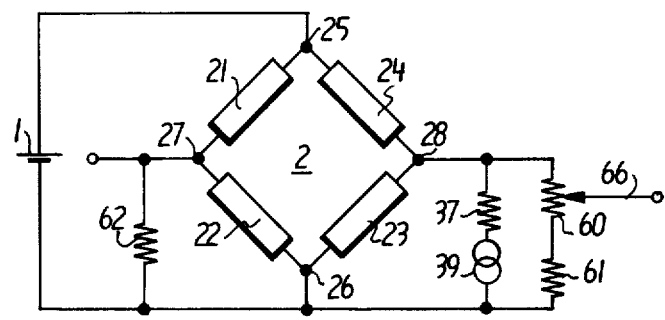
FIG. 8B is a circuit diagram of an equivalent bridge circuit to that shown in FIG. 8A.

Referring now to FIG. 8, a third embodiment of a circuit for detecting a physical quantity of the second aspect according to the present invention will be explained. As shown in FIG. 8A, the circuit of the third embodiment is characterized in that the zero adjustment of the bridge circuit having a negative initial unbalanced voltage can be achieved by adding a second fixed resistor. One end of the variable resistor 60 is connected to the negative output terminal 28 of the bridge circuit 2 having good or compensated heat output characteristics and having a negative initial unbalanced voltage. The other end of the variable resistor 60 is connected to the negative input terminal 26 through a first fixed resistor 61. The control terminal 66 of the variable resistor 60 and the positive output terminal 27 of the bridge circuit 2 are respectively connected with the negative input terminal 31 and the positive input terminal 32 of the differential DC amplifier 3. A second fixed resistor 62 is connected between the positive output terminal 27 and the negative input terminal 26 of the bridge circuit 2. The resistance value of the second fixed resistor 62 is equal to the parallel resistance value of the series resistance value of said variable resistor 60 and the first fixed resistor 61 and the resistance value of feedback resistor 37. The other connections are similar to the circuits of the first and second embodiments and need not be repeated. The respective resistance values of the resistors of this embodiment may be, in an example, as follows:

$R_{21}$ to $R_{24}$ = about 1kΩ; $R_{37}$ = 10KΩ; $R_{60}$ = 10KΩ; $R_{61}$ = 90KΩ; and $R_{62}$ = 9.1KΩ.

The operation of the circuit of FIG. 8A will now be explained. Similar to the circuits of the first and the second embodiments, the voltage of the bridge circuit 2 is amplified by means of a differential DC amplifier 3. Referring to the equivalent bridge circuit of FIG. 8A shown in FIG. 8B, the variable resistor 60 and the first fixed resistor 61 connected in series are connected to the strain gauge element 23 in parallel, and the second fixed resistor 62 is connected to the strain gauge element 22 in parallel. The resistance value added to the strain gauge element 23 in parallel is equal to that added to the strain gauge element 22 in parallel, and therefore, both the initial unbalanced voltage and the characteristics of the thermal zeroshift of the output obtained at the ouput terminals 27 and 28 hardly vary. The output having a voltage lower than that at the negative output terminal 28 by an arbitrary value ranging from 0 to about 1/20 Vi depending on the position of the said control terminal 66 always appears across the control terminal 66 of the variable resistor 60 and the positive output thermal 27 of the bridge circuit.

Thus, the initial unbalanced voltage from 0 to −1/20 Vi of the bridge circuit 2 is adjusted to zero by means of the variable resistor 60, and the temperature characteristics of the zero point are good as well as having good characteristics of thermal zeroshift of the bridge circuit 2., Thus, the output, which is zero adjusted and has characteristics equal to those of the circuits of the first and second embodiments, can be obtained at the output terminals 33 and 34 of the circuit of this embodiment.

In the circuit of the third embodiment, the second fixed resistor 62 is connected to the strain gauge element 22 in parallel. Instead, the second fixed resistor may be connected with the strain gauge element 24 in parallel as a modified example, and the same operating effect as that of the circuit depicted in FIG. 8A may be realized.

Moveover, in the circuit of the third embodiment, the variable resistor and the first fixed resistor connected in series are connected to the strain gauge element 23 in parallel. But as a modified example, the variable resistor and the first fixed resistor may be connected in parallel with the strain gauge element 21. More specifically, in such a modified example, one end of the variable resistor is connected with the positive output terminal 27 of the bridge circuit, and the other end of the variable resistor may be connected with the positive input terminal 25 through the first fixed resistor, and the control terminal 66 of the variable resistor and the negative output terminal 26 of the bridge circuit are respectively connected with the positive input terminal 32 and the negative input terminal 31 of the differential DC amplifier.

Figure 9A:
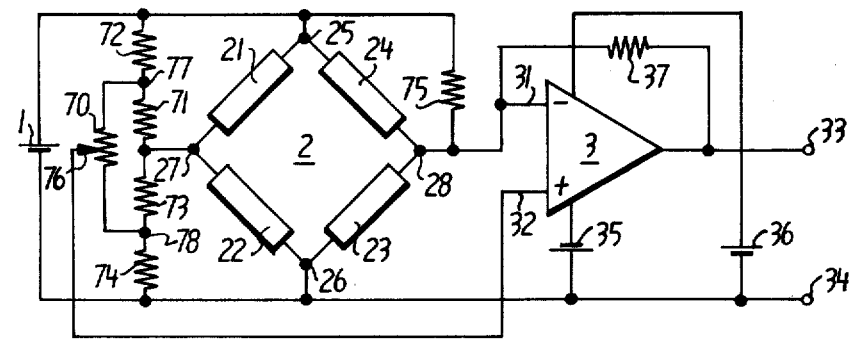
FIG. 9A is a circuit diagram of a fourth preferred embodiment according to the second aspect of the present invention.

Referring now to FIG. 9, the second group of the second aspect according to the present invention is illustrated in connection with a fourth preferred embodiment of a circuit for detecting a physical quantity. In the circuits of the first to third embodiments of the second aspect according to the present invention the zero adjusting range of the output is limited to either the positive or negative side. But in the fourth embodiment the first to third embodiments are slightly modified so that the zero adjustment can be performed in both the positive side and the negative side, with a bridge circuit having an initial unbalanced voltage either positive or negative. In the circuit of the fourth embodiment shown in FIG. 9A, one end of the first fixed resistor 71 is connected to the positive output terminal 27 of the bridge circuit 2 having the predetermined initial unbalanced voltage, the other end of the first fixed resistor 71 being connected to the positive input terminal 25 through a second fixed resistor 72. One end of a third fixed resistor 73 is connected to the positive output terminal 27, and the other end of the third fixed resistor 73 is connected to the negative input terminal 26 through the fourth fixed resistor 74. The variable resistor 70 is connected between the junction 77 of the first and second fixed resistors and the junction 78 of the said third and fourth fixed resistors. The control terminal 76 of the variable resistor 70 and the negative output terminal 28 of the bridge circuit 2 are respectively connected to the positive input terminal 32 and the negative input terminal 31 of the differential DC amplifier 3. A fifth fixed resistor 75 is inserted between the positive input terminal 25 and the negative output terminal 28 of the bridge circuit 2, the other connections being similar to those of the circuits of the first to third embodiments. In this aspect, the series resistance value of the first and second fixed resistors is equal to that of the third and fourth fixed resistors, and the value of the fifth resistor 75 is equal to that of the feedback resistor 37. The respective resistance values in an example may be selected as follows: $R_{21}$ to $R_{24}$ = about $1K\Omega$; $R_{37}$ = $R_{75}$ = $10K\Omega$; $R_{71}$ = $R_{73}$ = $1K\Omega$; $R_{72}$ = $R_{74}$ = $9K\Omega$; and $R_{70}$ = $2K\Omega$.

Figure 9B:
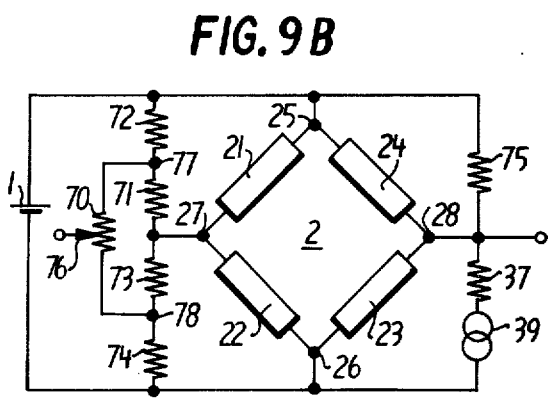
FIG. 9B is a circuit diagram of an equivalent bridge circuit to that shown in FIG. 9A

The operation of the circuit of FIG. 9A will now be explained. The amplifying operation of the unbalanced voltage of the bridge circuit 2 by means of the differential DC amplifier 3 is entirely the same as the circuits of the first to third embodiments. Therefore, the output amplified to a value about 20 times of the unbalanced voltage is obtained at the output terminals 33 and 34 of the circuit of this embodiment. FIG. 9B is the equivalent bridge circuit of the fourth embodiment, wherein the first and second fixed resistors connected in series, the third and fourth fixed resistors connected in series, and the fifth resistor are connected with strain gauge elements 21, 22 and 24 in parallel respectively. The variable resister 70 is inserted between the junction 77 of the first and second fixed resistors and junction 78 of the third and fourth fixed resistors. The connection of the feedback resistor 37 is equal to that in the circuits of the first to third embodiments. The resistance value added to the strain gauge element 21 in parallel is equal to the resistance value added to the strain gauge element 22 in parallel, and the resistance value equivalently added in parallel the strain gauge element 23 is equal to the resistance value added to the strain gauge element 24 in parallel, so that the initial unbalanced voltage obtained across the output terminals 27 and 28 of the bridge circuit 2 hardly varies. The resistance temperature coefficient of the arm having strain gauge element 21 is equal to that of the arm having strain gauge element 22, and the resistance temperature coefficient of the arm having strain gauge element 23 is equal to that of the arm having strain gauge element 24, and therefore, the characteristics of the thermal zeroshift hardly vary. The voltage at the junction 77 of the first and second fixed resistors is always higher than the voltage at the positive output terminal 27 by the voltage value which is obtained by dividing the voltage applied to the arm having strain gauge element 21 in accordance with the ratio of the first fixed resistor and the second fixed resistor. The voltage at the junction 78 of the third and fourth fixed resistors is always lower than the voltage at the positive output terminal 27 by the voltage value which is obtained by dividing the voltage applied to the arm having strain gauge element 22 in accordance with the ratio of the third fixed resistor and the fourth resistor. The divided values decrease because the variable resistor 70 is connected between the two junctions 77 and 78. However, an arbitrary voltage value is obtained across the control terminal 76 of the variable resistor and the negative output terminal 28 of the bridge circuit 2, which ranges from a high voltage value by the value divided in accordance with the ratio of the first and second fixed resistors to a lower voltage value by the value divided in accordance with the ratio of the third and fourth fixed resistors than the voltage obtained across the output terminals 27 and 28 of the bridge circuit 2. Thus the initial unbalanced voltage of the birdge circuit 2 is adjusted to zero by regulating the variable resistor 70 and the output of good characteristics of thermal zeroshift can be obtained across the control terminal 76 and the negative output terminal 28. The zero adjustment by means of the variable resistor 70 is carried out in the range from the positive voltage value across the positive output terminal 27 and the junction 77 of the first and second fixed resistors to the negative voltage value across the positive output terminal 27 and the junction 78 of the third and fourth fixed resistors. The said value ranges from about 1/40 Vi to −1/40 Vi. Therefore, the zero adjustment can be effectively carried out with the bridge circuit 2 of which the initial unbalanced voltage is from −1/40 Vi to +1/40 Vi. It is apparent that even if Vi is varied the once adjusted zero point between the control terminal 76 and the minus side output terminal 28 is not affected, similar to the cases of the circuits of the first to third embodiments.

According to this embodiment, the voltage of the bridge circuit 2 of good characteristics of thermal zeroshift and having a predetermined initial unbalanced voltage is amplified, and at the same time, the initial unbalanced voltage is adjusted to zero by means of the variable resistor 70 without damaging the good characteristics of thermal zeroshift. Also, the zero point of the output will not vary even if the input voltage of the bridge circuit is varied. Thus a stable output against any temperature variation can be obtained across the output terminals 33 and 34.

In the circuit of the fourth embodiment, the fifth fixed resistor 75 is connected to the strain gauge element 24 in parallel, but resistor 25 may be connected with the strain gauge element 22 in parallel as one modification. Also, in one end of the first fixed resistor 71 and one end of the third fixed resistor 73 are respectively connected with the positive output terminal 27 of the bridge circuit 2, but as another modification, the ends may be connected with the negative output terminal 28, and the control terminal 76 of the variable resistor 70 and the positive output terminal 27 of the bridge circuit 2 may be respectively connected with the negative input terminal 31 and the positive input terminal 32 of the differential DC amplifier 3. In the latter modification, if the fifth fixed resistor is connected with one arm of the bridge circuit together with one of the series resistors 71, 72 and 73, 74, said fifth fixed resistor can be omitted by selecting the series resistance value of said arm.

Similar to the first aspect of the present invention, the second aspect of the present invention is not limited to the circuits of the first through fourth embodiments. For example, it was assumed that the characteristics of the thermal zeroshift of the bridge circuit 2 were either good or were compensated for by another method, but the present invention is not limited to such conditions. For instance, in the bridge circuit generating the thermal zeroshift because of the inequality of the resistance temperature coefficients of the strain gauge elements 21 to 24, the resistance temperature coefficients of the suitable arms may be varied to compensate the thermal zeroshift of the bridge circuit by properly selecting the series resistance value of the variable resistor and the first fixed resistor with the circuits of the first and second embodiments, the second fixed resistance value besides the serial resistance value with the circuit of the third embodiment, and the series resistance value of the first and second fixed resistors, that of the third and fourth fixed resistors and the value of the fifth fixed resistor respectively. As a result, the amplified and zero adjusted output stable against temperature variations is obtained at the output terminals of the circuit for detecting a physical quantity of the present invention. In certain special cases, the second fixed resistor of the circuit of the third embodiment and the fifth fixed resistor of the circuit of the fourth embodiment may be omitted.

In the above-described circuits of the preferred embodiments, an independent constant voltage source was employed as the bridge power source 1, though the power sources 36 and 35 for the differential DC amplifier 3 can be used as the bridge power source, directly or through zener diodes. According to the present invention, the zero point of the output, once adjusted, is not affected by the variation of the input voltage Vi of the bridge circuit. Therefore, it is apparent that the zero point of the output is stabilized without any shift, even if the power source 1 is constructed so that the voltage Vi has suitable temperature characteristics for the temperature compensation of the output sensitivity of the bridge circuit. A phase compensation circuit may be added to the differential DC amplifier in order to stably operate the amplifier. The amount of amplification may be adjusted inserting a variable resistance between the output terminal 33 of the differential DC amplifier and the terminal 34 which are terminals of the power source 36, and connecting one end of the feedback resistor with the control terminal of the said variable resistor, and by varying the feedback amount.

Moreover, an object of the circuits of the embodiments described above, was to adjust the initial unbalanced voltage of the bridge circuit to zero, but the present invention is not limited to this operation. Also, an arbitrary offset voltage can be obtained as the output, and in this condition, the heat characteristics of the thermal zeroshift of the bridge circuit is also hardly affected. The zero adjustment of the output was performed by means of a variable resistor, but the variable resistor can be replaced by two equivalent fixed resistors after the adjusting operation.

In summary, according to the second aspect of the present invention, the output of the bridge circuit is amplified and the zero adjustment of the output can be performed by adjusting a variable resistor without one terminal of the bridge circuit being open. Also, the characteristics of thermal zeroshift are not affected, or the thermal zeroshift can be easily compensated. The zero point will not be shifted even if the input voltage of the bridge circuit is varied and therefore, a highly practical and useful circuit for detecting a physical quantity can be realized.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A circuit for detecting a physical quantity which may be adjusted without affecting thermal zero shift characteristics, comprising:
   a bridge circuit including four sensitive elements coupled in four respective arms thereof, two input and two output terminals, and sensitive elements each having a resistivity which is variable in proportion to a physical quantity to be applied thereto;
   variable resistor means including a first fixed resistor having an adjustable tap connected thereto for providing a variable resistance output, whereby adjustment of said tap does not change the thermal characteristics of said first fixed resistor;

second and third resistors connected in series and coupled in parallel with a first arm of said bridge circuit, fourth and fifth resistors connected in series and coupled in parallel with a second arm of said bridge circuit, said first and second arms being adjacent arms of said bridge circuit, said first fixed resistor coupled to a connecting point between said second and third resistors and to a connecting point between said fourth and fifth resistors whereby said first fixed resistor is coupled in parallel with said third and fourth resistors.

2. A circuit as in claim 1, further comprising:

a differential amplifier having two input terminals, one of said input terminals coupled to said adjustable tap and the other input terminal coupled to an output terminal of said bridge circuit; and, a feedback resistor having a predetermined resistance coupled to said differential amplifier.

3. A circuit for detecting a physical quantity according to claim 2, wherein resistance values of said sensitive elements, said second, third, fourth and fifth resistors, said first fixed resistor means, said resistor means and said feedback resistor are approximately 1K$\Omega$, 9K$\Omega$, 1K$\Omega$, 9K$\Omega$, 10K$\Omega$ and 10K$\Omega$ respectively.

4. A circuit for detecting a physical quantity according to claim 1, wherein the resistance values of said sensitive elements, said second, third, fourth and fifth resistors and said first fixed resistor are approximately 1K$\Omega$, 9K$\Omega$, 1K$\Omega$, 1 K$\Omega$, 9K$\Omega$ and 2K$\Omega$, respectively.

* * * * *